Patented Feb. 27, 1940

2,191,449

UNITED STATES PATENT OFFICE 2,191,449

PURIFICATION OF ORGANIC ACIDS

Arthur L. Blount, Palos Verdes Estates, Calif., assignor to Union Oil Company of California, Los Angeles, Calif., a corporation of California No Drawing. Application May 17, 1937,
Serial No. 143,117

2 Claims. (Cl. 202—57)

This invention relates to a method for the purification of certain corrosive organic acids. More specifically it relates to a process for the purification of naphthenic acids recovered from petroleum refinery alkali wastes or spent caustic recovered from petroleum refinery alkali wastes or spent caustic recovered during the treatment of kerosene, gas oil and lubricating oil with alkali such as aqueous sodium hydroxide. Acids produced by the oxidation of petroleum wax or petroleum fractions may also be purified according to the method and apparatus described herein. Furthermore acidic materials derived from coal tar, gas tar, and natural waxes and oxidation of these materials may also be purified according to the present invention.

In the treatment of petroleum fractions, and especially petroleum fractions produced from California asphalt base oil with an aqueous solution of caustic soda or caustic potash the naphthenic acids present in the oil are converted into water soluble soaps and are removed from the oil by such treatment in the aqueous solution.

The naphthenic acids present in petroleum are valuable in the manufacture of drier for use in the paint and varnish industry and the greater the purity of these acids the more valuable they become in drier manufacture, particularly when light-colored driers are desired.

If the aqueous solution of crude naphthenic acid soaps are acidified with a mineral acid such as sulphuric acid the naphthenic acids are liberated and may be separated from the aqueous phase by permitting the naphthenic acids to layer out and then removing the naphthenic acid layer from the aqueous layer. In practice the aqueous solution of naphthenate soaps is acidified with dilute sulphur acid and allowed to stand in a quiescent state. The liberated naphthenic acids being of lower specific gravity than the aqueous phase, rise to the top and form an upper layer. This upper layer is then skimmed away or decanted from the aqueous layer.

The crude naphthenic acids recovered by the foregoing method are unsuitable for many purposes since they contain impurities such as mineral oil, carbonaceous material, dark asphaltlike bodies and phenolic materials which lower the acid number of the naphthenic acids, impair their color and furthermore often lend to the acids a bad odor. In the purification of crude naphthenic acids for the separation of the impurities contained therein it has been found advisable to treat the crude naphthenic acids with strong sulphuric acid (25% to 98% $H_2SO_4$) for the separation of impurities contained therein and then to follow the acid treating step with a distillation step to refine further the acids. The acid treating step may be either in the presence or absence of a diluent such as gasoline or naphtha.

In the distillation of the naphthenic acids or the other aforementioned corrosive organic acids, for the separation of the acids from impurities which they contain, it has been found highly desirable to carry out the distillation in a still composed of a metal or material which is highly resistant to the corrosion of these acids and which will not unfavorably discolor the finished or distilled acids. I have discovered that molybdenum steel is highly suitable as a material for the construction of the distillation equipment to be employed for the distillation of naphthenic acids as well as the other aforementioned organic acids since molybdenum steel is highly resistant to the corrosive action of these acids. By the term "distillation equipment" I mean to include the still in which the distillation is actually carried out, the condenser in which the acid vapors are liquefied and all pipe or conduit through which the naphthenic acids are passed during distillation.

It is therefore an object to purify naphthenic acids or other organic acids having corrosive properties similar to those of naphthenic acids by distilling said acids in the presence of a metal containing molybdenum.

It is another object of the invention to distill naphthenic acids in a still having an inner lining composed of a metal containing molybdenum.

It is another object of this invention to purify corrosive organic acids of the naphthenic acid type by distilling said acids in distillation equipment composed of stainless steel containing chromium, nickel and molybdenum.

It is a further object to purify corrosive acids of the naphthenic acid type by distilling said acids in contact with a metal composed of stainless steel containing nickel, chromium and molybdenum.

The particular alloy which I employ for the distillation of naphthenic acids is a stainless steel composed of about 14% to 20% chromium, 6% to 20% nickel, 2% to 4% molybdenum, and the remainder iron. Alloys having compositions with the ranges given above are extremely resistant to the corrosive action of naphthenic acids and other corrosive organic acids as previously described.

The following method was employed to evaluate various metals for use in distillation equipment to be employed for the fractional distillation of naphthenic acids and the other organic acids mentioned above.

The metal test strips as received from the manufacturer were approximately 3" x 1.5" in size and of various thickness. Both sides and all edges were carefully polished on belt abrasive cloth, final treatment in all cases being with abrasive cloth No. 100. Calipers were used in measuring the strips, average lengths and widths being used if these strips were not exactly rectangular, although such variation was never greater than approximately 0.02 to 0.03 inch. A hole, $\frac{1}{16}$ inch in diameter, was drilled at the end of each strip and the strips numbered from 1 to 6 by a metal stamp. From the above measurements and allowing for the holes, the area exposed was calculated to 0.01 inch. The strips were washed in water, then alcohol, and finally acetone, previous to weighing. Check weights to 0.0002 gram were readily obtained.

The tests were run in large Pyrex test tubes, 2" x 16", heated electrically by individual furnaces. Each tube was fitted with a thermometer and a water condenser, the latter arranged so that the condensate fell back near the edge of the tube and thus would not drip on the metal strips. The strips were supported on glass crossbars, sealed to a glass rod at the desired heights. This glass rod was supported by a 90° bend above the cork stopper. The temperature of the acids was controlled to approximately ±5° F.

Approximately 300 ml. of refined naphthenic acids, were placed in the tubes and heated to 450° F. The metal strips were then suspended from the glass crossbars so that one pair, numbers 1 and 2, was in the gas phase, another pair, numbers 3 and 4, was at the interface or surface of the liquid, and the third pair, numbers 5 and 6, was in the liquid phase. No attempt was made to have strips 3 and 4, those at the surface of the liquid, exactly half immersed, since at the above temperature due to cracking or oxidation, a sludge was always found at the surface.

After 20 to 24 hours, the metal strips were removed, washed immediately in acetone to remove the naphthenic acids, and then cleaned with fresh acetone and polished with a soft cloth only. Subsequent washing in water, alcohol, and acetone was done, after which the strips were weighed. The strips were then replaced as before in the same tubes and the heating continued. Removal, cleaning and weighing of the strips at approximately 48-hour intervals was continued for a total elapsed time of at least 120 hours. If the corrosion rate appeared to be dropping off, as shown by plotting the loss in weight in mg./sq. in. against time, the test was continued until such rate became fairly constant.

Rezistal KA₂SMO which contains approximately 2–4% molybdenum possesses remarkable corrosion resistance. The loss in weight per square inch is reported to 0.01 mg. to show the small values obtained.

As mentioned, the tests on each metal were continued for at least 120 hours and longer if the corrosion rate appeared to decrease markedly with time. In the latter case, the calculation of the penetration in inches per month was made on this decreased rate.

The standard formula (Calcott, Whetzel and Whittaker, Corrosion Tests and Materials of Construction for Chemical Engineering Apparatus, 1923 edition, page 20)

$$C = 43.9 \frac{w}{Ast}$$

where
 $C$ = penetration in inches per month
 $w$ = loss of weight of test piece in grams during immersion
 $A$ = Area of test piece in square inches
 $s$ = specific gravity of the metal
 $t$ = time of exposure in hours,
was used.

The metals tested were as follows:

U. S. S. 18–8 low carbon__ Chromium 16–20%, nickel 7–11%, carbon less than .07%, remainder iron
Monel_____ Nickel 60–70%, copper 25–35%, iron 1–3%
Nickel_____ Nickel 99–99.9%
Allegheny 44_____ Chromium 23.18%, nickel 11.14%, carbon 0.17%, remainder iron
Inconel_____ Nickel 80%, chromium 14%, iron 6%
Rezistal (KA₂SMO) _____ Chromium 16 to 20%, nickel 7–11%, molybdenum 2.0–4%, carbon .07%

The following table shows the rate of corrosion of the above metals with naphthenic acids at 450° F.

*Rates of corrosion by naphthenic acids at 450° F.*

| Metal | Specific gravity[a] | Elapsed time used for calculation, hours | Rate of corrosion Inches penetration per month | | |
|---|---|---|---|---|---|
| | | | In vapor | At interface | In liquid |
| U. S. S. 18—8 low carbon | 7.86 | 0 to 120 | 0.000578 | | |
| | | 0 to 120 | | 0.000512 | |
| | | 72 to 120 | | | 0.00128 |
| Monel | 8.80 | 0 to 120 | 0.00299 | | |
| | | 0 to 120 | | 0.000129 | |
| | | 0 to 120 | | | 0.000170 |
| Nickel | 8.86 | 0 to 168 | 0.00336 | | |
| | | 0 to 168 | | 0.000082 | |
| | | 72 to 168 | | | 0.000619 |
| Allegheny 44 | 7.90 | 0 to 162 | 0.000013 | | |
| | | 0 to 162 | | 0.00120 | |
| | | 0 to 162 | | | 0.000525 |
| Inconel | 8.55 | 69 to 162 | 0.00055 | | |
| | | 69 to 162 | | 0.00044 | |
| | | 69 to 162 | | | 0.00022 |
| Rezistal (KA₂SMO) | 7.91 | 0 to 155 | 0.0000047 | | |
| | | 0 to 155 | | 0.0000047 | |
| | | 0 to 155 | | | 0.0000036 |

[a] All specific gravities were taken from literature.

From the above it is conclusive that the stainless steel containing molybdenum, chromium and nickel is the most satisfactory metal of the group for use in distillation equipment to be employed in the fractional distillation of corrosive organic acids of the type of naphthenic acids and the other aforementioned acids.

As shown in the foregoing table the percentage of molybdenum, chromium and nickel may vary in the particular stainless steel that I employ from 16% to 20% chromium, 7% to 11% nickel and 2% to 4% molybdenum, however, I have found that a steel containing 16.0% chromium, 13% nickel and 3% molybdenum is highly satisfactory.

It is to be understood that in the purification of the above materials in my stainless steel still, I may carry the distillation out at ordinary atmospheric pressure and where it is desired to keep the temperature at a minimum point during the distillation I may carry the distillation out in a vacuum.

Another application of the molybdenum stainless still described above is in the oxidation of hydrocarbon ore fractions. I have discovered that the acids formed during the oxidation of hydrocarbon oil fractions at elevated temperatures (350–650° F.) with air do not attack steel containing 14 to 20% chromium, 5 to 20% nickel and 2 to 4% molybdenum. Therefore, in the production and purification of acidic materials produced by contacting mineral oil fractions with air at elevated temperatures, I prefer to employ apparatus constructed of steel containing 14 to 20% chromium, 5 to 20% nickel and 2 to 4% molybdenum.

It is to be understood that the above disclosure is not to be taken as limiting, but may include any changes and modifications within the scope of the appended claims.

I claim:

1. A method of improving the color of naphthenic acids which comprises distilling said acids in a still composed of steel containing 16% to 20% chromium, 7% to 11% nickel and 2% to 4% molybdenum.

2. A method of improving the color of naphthenic acids which comprises distilling said acids in a still having an inner lining composed of 14% to 20% chromium, 5% to 20% nickel, 2% to 4% molybdenum and the remainder iron.

ARTHUR L. BLOUNT.